United States Patent [19]
Farnworth et al.
[11] Patent Number: 4,650,599
[45] Date of Patent: Mar. 17, 1987

[54] FREE-FLOWING DETERGENT POWDER COMPOSITIONS CONTAINING SODIUM PERBORATE MONOHYDRATE

[75] Inventors: Pauline Farnworth, Upton; Peter F. Garner-Gray, Fulwood; Michael W. Parslow, Upton by Chester, all of Great Britain

[73] Assignee: Lever Brothers Company, New York, N.Y.

[21] Appl. No.: 733,156

[22] Filed: May 13, 1985

[30] Foreign Application Priority Data

May 17, 1984 [GB] United Kingdom ................. 8412537

[51] Int. Cl.$^4$ ......................... C09K 3/00; C11D 3/395; C11D 17/06

[52] U.S. Cl. ....................................... 252/99; 252/102; 252/140; 252/383; 252/385

[58] Field of Search .................. 252/99, 102, 383, 385

[56] References Cited

U.S. PATENT DOCUMENTS 3,914,380 10/1975 Dillenburg .......................... 423/279
4,002,434 1/1977 Simmersbach ..................... 23/293 R
4,115,519 9/1978 Brichard ............................ 423/279
4,490,269 12/1984 Gallopo ............................... 252/94
4,499,001 2/1985 Eoga ..................................... 252/99
4,539,131 9/1985 Garner-Gray ........................ 252/99
4,540,504 9/1985 Eoga ..................................... 252/99
4,545,784 10/1985 Sanderson .............................. 8/107

FOREIGN PATENT DOCUMENTS 1963897 7/1971 Fed. Rep. of Germany .
1321267 6/1973 United Kingdom .
1573406 8/1980 United Kingdom .

*Primary Examiner*—Dennis L. Albrecht
*Attorney, Agent, or Firm*—Milton L. Honig; James J. Farrell

[57] ABSTRACT

Improved detergent powder compositions containing at least a detergent-active material, a detergency builder and sodium perborate monohydrate, and method of making such compositions are disclosed, the improvement being that a sodium perborate monohydrate is used which has physical characteristics of specific surface area (SA in $m^2/g$) and pore volume (PV in $cm^3/g$) such that the formula ($SA+31.25\ PV-16.25$) is greater than zero. The detergent powder compositions comprising said specific perborate monohydrate have less tendency to caking during storage under high humidity climatic conditions and have the further advantage of maintaining their quick bleach delivery in solution owing to said perborate monohydrate which retains its rapid rate of dissolution despite water-uptake during storage.

13 Claims, No Drawings

FREE-FLOWING DETERGENT POWDER COMPOSITIONS CONTAINING SODIUM PERBORATE MONOHYDRATE

This invention relates to detergent powder compositions containing sodium perborate monohydrate, which are particularly but not essentially adapted for fabric washing.

Sodium perborate is a well-known bleaching agent widely used in fabric washing powders. It is normally used commercially in the form of its tetrahydrate, the empirical formula of which can be written as $NaBO_3.4H_2O$ or $NaBO_2.H_2O_2.3H_2O$.

Sodium perborate also exists as the so-called monohydrate, of which the empirical formula can be written as $NaBO_3.H_2O$ or $NaBO_2.H_2O_2$.

Sodium perborate monohydrate is not widely used in detergent compositions, but its use in detergent powder compositions is described in, for example, GB No. 1,573,406; German Patent Applications Nos. 1,951,556, 1,963,897 and 1,963,898; and European patent application No. 98,108.

There are advantages in using sodium perborate monohydrate over sodium perborate tetrahydrate, mainly because of its elevated active oxygen content (theoretical value 16.03% active oxygen as compared to 10.4% for sodium perborate tetrahydrate) and its stability at higher temperatures. One major disadvantage of sodium perborate monohydrate is, however, that, as it takes up water, it tends to cake under high humidity conditions and thereby tends to cause more or less severe reduction of the free-flowing properties of detergent powder compositions incorporating sodium perborate monohydrate. Another consequence of said water-uptake is that the dissolution rate of sodium perborate monohydrate becomes less rapid, thereby affecting its bleach delivery.

It is therefore an object of the present invention to provide detergent powder compositions containing sodium perborate monohydrate which remain free-flowing with less tendency to caking during storage under high humidity climatic conditions.

It is a further object of the invention to provide detergent powder compositions containing sodium perborate monohydrate, wherein said sodium perborate monohydrate retains its rapid rate of dissolution even during storage under high humidity conditions.

It has now surprisingly been found that the above objects can be achieved if sodium perborate monohydrate in particulate form is used in the composition, which has physical characteristics of specific surface area (SA in $m^2/g$) and pore volume (PV in $cm^3/g$) such that $SA+31.25\ PV-16.25>0$.

In the further description of the invention the aboveexpressed formula $(SA+31.25\ PV-16.25)$ is referred to as "Perborate Caking Index" (P.C.I.).

Thus, in order to achieve the above objects, the sodium perborate monohydrate used in the composition of the invention should have a "Perborate Caking Index" (P.C.I.) as defined hereinabove greater than zero.

The pore volume (PV) is defined as the volume, in $cm^3/g$, in pores of diameter lying between 0.1 and 1.0 $\mu m$, as measured by mercury intrusion using a Quantachrome Scanning Porosimeter.

The specific surface area (SA) is defined as that determined by nitrogen gas adsorption, commonly known as the B.E.T. method.

Accordingly, the invention provides an improved detergent powder composition containing at least a detergentactive material, a detergency builder and sodium perborate monohydrate in particulate form, characterized in that the sodium perborate monohydrate has physical characteristics of specific surface area (SA in $m^2/g$) as defined hereinabove and pore volume (PV in $cm^3/g$) as defined hereinabove such that the formula $(SA+31.25\ PV-16.25)$ is greater than zero.

It is preferred that the perborate monohydrate as characterized above should have a pore volume in the abovedescribed pore size range greater than 0.2 $cm^3$/gram.

It is furthermore desirable that the perborate monohydrate used has a specific surface area of more than 5 $m^2$/ gram, preferably more than 7 $m^2$/gram, which, apart from improved bleach stability, particularly in low phosphate formulations, also seems to have a favourable influence on the anti-caking properties.

The higher the P.C.I. value, the better will generally be the behaviour of the sodium perborate monohydrate in the powder, though the further improvement achieved will be less marked at higher P.C.I. values.

Preferably, the sodium perborate monohydrate used in the composition of the invention will have P.C.I. as defined hereinabove greater than 1.

The particle size of the perborate monohydrate is not critical and normal particle sizes of 100–1000 $\mu m$, preferably from 200–500 $\mu m$ may be used in the compositions of the invention.

It should be noted that specific surface area and particle size are not determined by the pore volume and pore size of sodium perborate monohydrate.

The detergent compositions of the invention necessarily contain a detergent-active material. This may be a naturally derived detergent-active material, such as soap, or a synthetic detergent-active material selected from synthetic anionic, nonionic, amphoteric, zwitterionic or cationic detergent-active materials or mixtures thereof.

Many suitable detergent-active compounds are commercially available and are fully described in the literature, for example in "Surface Active Agents and Detergents", Volumes I and II, by Schwartz, Perry and Berch.

The total level of the detergent-active material may be from about 4% up to 50% by weight, preferably from about 10 to 25% by weight of the composition.

The synthetic anionic detergent compounds are usually water-soluble alkali metal salts of organic sulphates and sulphonates having alkyl radicals containing from about 8 to about 22 carbon atoms, the term alkyl being used to include the alkyl portion of higher aryl radicals.

Examples of suitable synthetic anionic detergent compounds are sodium and potassium alkyl sulphates, especially those obtained by sulphating higher ($C_8$–$C_{18}$) alcohols produced for example from tallow or coconut oil; sodium and potassium alkyl ($C_9$–$C_{20}$) benzene sulphonates, particularly sodium linear secondary alkyl ($C_{10}$–$C_{15}$) benzene sulphonates; sodium alkyl glyceryl ether sulphates, especially those ethers of the higher alcohols derived from tallow or coconut oil and synthetic alcohols derived from petroleum; sodium coconut oil fatty acid monoglyceride sulphates and sulphonates; sodium and potassium salts of sulphuric acid esters of higher ($C_9$–$C_{18}$) fatty alcohol-alkylene oxide, particularly ethylene oxide, reaction products; the reaction products of fatty acids such as coconut fatty acids esterified with isethionic acid and neutralized with sodium hydroxide; sodium and potassium salts of fatty acid amides of methyl taurine; alkane monosulphonates such as those derived by reacting alpha-olefins ($C_8$–$C_{20}$) with sodium bisulphite and those derived by reacting paraffins with $SO_2$ and $Cl_2$ and then hydrolyzing with a base to produce a random sulphonate; and olefin sulphonates, which term is used to describe the material made by reacting olefins, particularly $C_{10}$–$C_{20}$ alpha-olefins, with $SO_3$ and then neutralizing and hydrolyzing the reaction product. The preferred anionic detergent compounds are sodium ($C_{11}$–$C_{15}$) alkylbenzene sulphonates and sodium ($C_{16}$–$C_{18}$) alkyl sulphates.

Examples of suitable nonionic detergent compounds which may be used, preferably together with the anionic detergent compounds, include in particular the reaction products of alkylene oxides, usually ethylene oxide, with alkyl ($C_6$–$C_{22}$) phenols, generally 5–25 EO, i.e. 5–25 units of ethylene oxides per molecule; the condensation products of aliphatic ($C_8$–$C_{18}$) primary or secondary linear or branched alcohols with ethylene oxide, generally 6–30 EO, and products made by condensation of ethylene oxide with the reaction products of propylene oxide and ethylene diamine. Other so-called nonionic detergent compounds include long chain tertiary amine oxides, long chain tertiary phosphine oxides and dialkyl sulphoxides.

Mixtures of the anionic detergent compounds with, for example, nonionic compounds may be used in the detergent compositions, particularly to provide controlled low sudsing properties. This is beneficial for compositions intended for use in suds-intolerant automatic washing machines. The presence of some nonionic detergent compounds in the compositions may also help to improve the solubility characteristics of the detergent powder.

Amounts of amphoteric or zwitterionic detergent compounds can also be used in the compositions of the invention but this is not normally desired owing to their relatively high cost. If any amphoteric or zwitterionic detergent compounds are used, it is generally in small amounts in compositions based on the much more commonly used synthetic anionic and nonionic detergent compounds.

As stated above, soaps may also be used in the compositions of the invention, preferably at a level of less than 30% by weight. They are particularly useful at low levels in binary (soap/anionic) or ternary mixtures together with nonionic or mixed synthetic anionic and nonionic detergent compounds, which have low sudsing properties. The soaps which are used are preferably the sodium, or less desirably potassium, salts of saturated or unsaturated $C_{10}$–$C_{24}$ fatty acids or mixtures thereof. The amount of such soaps can be varied between about 0.5% and about 25% by weight, with lower amounts of about 0.5% to about 5% being generally sufficient for lather control. Amounts of soap between about 2% and about 20%, especially between about 5% and about 15%, are preferably used to give a beneficial effect on detergency. This is particularly valuable in compositions used in hard water when the soap acts as a supplementary builder. In addition, we have found that the addition of soap helps to decrease the tendency of compositions to form inorganic deposits in the wash, particularly where the composition contains a calcium ion precipitant material such as sodium carbonate or sodium orthophosphate, for which purpose it is preferred to use about 2% to about 15%, especially about 2.5% to about 10% by weight of soap in the composition.

Preferred detergent-active systems for use in the present invention are mixtures of anionic detergent compounds with nonionic detergent-active compounds with or without a soap component.

The detergent compositions of the invention will normally also contain a detergency builder.

Thus, the compositions of the invention may contain detergency builder materials selected from (1) calcium sequestrant builder materials, (2) precipitating builder materials, (3) calcium ion-exchange builder materials and (4) mixtures thereof.

Examples of calcium sequestrant builder materials include alkali metal polyphosphates, such as sodium tripolyphosphate; nitrilotriacetic acid and its water-soluble salts; the alkali metal salts of ethylene diamine tetraacetic acid, oxydisuccinic acid, mellitic acid, benzene polycarboxylic acids, citric acid; and polyacetalcarboxylates as disclosed in U.S. Pat. Nos. 4,144,226 and 4,146,495.

Examples of precipitating builder materials include sodium orthophosphate, sodium carbonate and long-chained fatty acid soaps.

Examples of calcium ion-exchange builder materials include the various types of water-insoluble crystalline or amorphous aluminosilicates, of which zeolites are the best known representatives.

In particular the compositions of the invention may contain any one of the organic or inorganic builder materials, such as sodium or potassium tripolyphosphate, sodium or potassium pyrophosphate, sodium or potassium orthophosphate, sodium carbonate, the sodium salt of nitrilotriacetic acid, sodium citrate, carboxymethylmalonate, carboxymethyloxysuccinate and the waterinsoluble crystalline or amorphous aluminosilicate builder materials, or mixtures thereof.

These builder materials may be present at a level of for example from 5 to 80% by weight, preferably from 10 to 60% by weight.

Typically, sodium tripolyphosphate-free detergent powder compositions normally tend to show poor free-flowing properties. The present invention is particularly applicable to such detergent powder compositions for improving the free-flowing properties.

Lately, phosphate legislations in a number of countries have forced detergent manufacturers to reduce the phosphorus content of detergent compositions down to a level of not more than 6% by weight. The present invention is also of particular importance to such low to nil phosphorus detergent powder compositions.

Low phosphorus detergent powder compositions may contain more than 5% sodium tripolyphosphate supplemented with other detergency builder materials. Preferred builder systems usable in this category of low phosphorus detergent powder compositions are sodium triphosphate combined with an alkali metal nitrilotriacetate, alkali metal orthophosphate, alkali metal pyrophosphate, alkali metal carbonate, aluminosilicates, e.g. zeolites, or mixtures thereof.

Low phosphorus detergent powder compositions of another category contain less than 5% to 0% by weight of sodium tripolyphosphate and have other builder materials as the main builder component. Examples of builder systems which can be used in this category of low phosphorus detergent compositions include those aforementioned builder systems containing sodium tripolyphosphate as well as any builder systems which do not contain sodium tripolyphosphate. Preferred detergency builders usable in this category are the alkali metal carbonates, particularly sodium carbonate; sodium aluminosilicates; nitrilotriacetate; and mixtures thereof.

Generally, such low phosphorus detergent powder compositions of both categories have poor powder flow properties. They tend to be sticky and to cake in the pack. The free-flowing properties of such detergent powder compositions can be substantially improved by the use of sodium perborate monohydrate having Perborate Caking Index according to the invention greater than zero.

The invention is also of particular importance for improving the free-flowing properties of detergent powder compositions containing high levels of nonionic detergent-active materials, i.e. with nonionic contents of from 4–25% by weight, particularly from 15–16% by weight.

A suitable level of sodium perborate monohydrate in the composition of the invention is usually from 5 to 50% by weight, preferably from 7 to 35% by weight.

The detergent compositions of the present invention may contain an activator for the perborate, particularly when the compositions are intended for washing fabrics at temperatures below about 60% C.

Rapid rate of dissolution and, by consequence thereof, a speedy bleach delivery of the sodium perborate monohydrate in the composition of the invention is of great advantage for a quick peroxy acid formation in the wash liquor.

Activators for peroxybleach compounds have been amply described in the literature, including British Pat. Nos. 836,988, 855,735, 907,356, 907,358, 970,950, 1,003,310 and 1,246,339, U.S. Pat. Nos. 3,332,882 and 4,128,494, Canadian Pat. No. 844,481 and South African Pat. No. 68/6344. Specific suitable activators include:

(a) N-diacylated and N'N'-polyacylated amines, such as N,N,N',N'-tetraacetyl methylene diamine and N,N,N',N'-tetraacetyl ethylene diamine, N,N-diacetylaniline, N,N-diacetyl-p-toluidine; 1,3-diacylated hydantoins such as, for example, 1,3-diacetyl-5,5-dimethyl hydantoin and 1,3-dipropionyl hydantoin; alpha-acetoxy-(N,N')-polyacylmalonamide, for example alpha-acetoxy-(N,N')-diacetyl malonamide;

(b) N-alkyl-N-sulphonyl carbonamides, for example the compounds N-methyl-N-mesyl-acetamide, N-methyl-N-mesyl-benzamide, N-methyl-N-mesyl-p-nitrobenzamide, and N-methyl-N-mesyl-p-methoxybenzamide;

(c) N-acylated cyclic hydrazides, acylated triazones or urazoles, for example monoacetyl maleic acid hydrazide;

(d) O,N,N-trisaturated hydroxylamines, such as 0-benzoyl-N,N-succinyl hydroxylamine, 0-acetyl-N,N-succinyl hydroxylamine, 0-p-methoxybenzoyl-N,N-succinyl-hydroxylamine, 0-p-nitrobenzoyl-N,N-succinyl-hydroxylamine and O,N,N-triacetyl hydroxylamine;

(e) N,N'-diacyl-sulphurylamides, for example N,N'-dimethyl-N,N'-diacetyl-sulphurylamide and N,N'-diethyl-N,N'-diproprionyl sulphurylamide;

(f) Triacyl cyanurates, for example triacetyl cyanurate and tribenzoyl cyanurate;

(g) Carboxylic acid anhydrides, such as benzoic anhydride, m-chloro-benzoic anhydride, phthalic anhydride, 4-chloro phthalic anhydride;

(h) Esters, for example glucose pentaacetate and xylose tetraacetate, sodium acetoxy benzene sulphonate and sodium benzoyloxy benzene sulphonate; sodium $C_6$–$C_{18}$ alkanoyloxy benzene sulphonates, such as sodium octanoyloxy benzene sulphonate and sodium nonanoyloxy benzene sulphonate;

(i) 1,3-diacyl-4,5-diacyloxy-imidazolidine, for example 1,3-diformyl-4,5-diacetoxy-imidazolidine, 1,3-diacetyl-4,5-diacetoxy-imidazolidine, 1,3-diacetyl-4,5-dipropionyloxy-imidazoline;

(j) Tetraacetyl glycoluril and tetraproprionyl glycoluril;

(k) Diacylated 2,5-diketopiperazine, such as 1,4-diacetyl-2,5-diketopiperazine, 1,4-diproprionyl-2,5-diketopiperazine and 1,4-dipropionyl-3,6-dimethyl-2,5-diketopiperazine;

(l) Acylation products of propylene diurea or 2,2-dimethyl propylene diurea (2,4,6,8-tetraaza-bicyclo-(3,3,2)-nonane-3,7-dione or its 9,9-dimethyl derivative), especially the tetraacetyl- or the tetrapropionyl-propylene diurea or their dimethyl derivatives;

(m) Carbonic acid esters, for example the sodium salts of p-(ethoxycarbonyloxy)-benzoic acid and p-(propoxy-carbonyloxy)-benzene sulphonic acid;

(n) Acyloxy-(N,N')-polyacyl malonamides, such as alphaacetoxy-(N,N')-diacetyl malonamide.

The N-diacylated and N,N'-polyacylated amines mentioned under (a) and esters mentioned under (h) are of special interest, particularly N,N,N',N'-tetraacetyl-ethylene diamine (TAED) and sodium nonanoyloxy benzene sulphonate (SNOBS).

The ratio by weight of the perborate to the activator may be from about 30:1 to about 1:1, preferably about 15:1 to about 2:1, although weight ratios outside these limits are not excluded.

If an activator is present, it is preferred to include in the detergent compositions a stabilizer for the bleach system, for example ethylene diamine tetramethylene phosphonate and diethylene triamine pentamethylene phosphonate. These stabilizers can be used in acid or salt form, or especially in calcium, magnesium, zinc or aluminium complex form, as described in GB No. 2,048,930. The stabilizer may be present at a level of up to about 1% by weight, preferably between about 0.03% and about 0.5% by weight. Apart from the components already mentioned, the detergent compositions of the invention can contain any of the conventional additives in the amounts in which such materials are normally employed in fabric washing detergent compositions. Examples of these additives include lather boosters such as alkanolamides, particularly the monoethanolamides derived from palmkernel fatty acids and coconut fatty acids, lather depressants such as alkyl phosphates and silicates, anti-redeposition agents such as sodium carboxymethylcellulose and alkyl or substituted alkylcellulose ethers, other stabilizers such as ethylene diamine tetraacetic acid, fabric softening agents, inorganic salts such as sodium sulphate, and, usually present in very small amounts, fluorescent agents, perfumes, enzymes such as proteases, lipases and amylases, germicides and colourants.

Other bleach materials and/or bleach catalysts may also be incorporated if desired, together with the sodium perborate monohydrate. As such can be named peroxy acids, photobleaches; other percompounds, such as the alkali metal percarbonates, persilicates, persulphates and also sodium perborate tetrahydrate; and heavy metal catalysts, such as manganese.

It may be desirable to include in the compositions an amount of an alkali metal silicate, particularly sodium ortho-, meta-, neutral or alkaline silicate. The presence of such alkali metal silicates at levels of at least about 1%, and preferably from about 5% to about 15% by weight of the compositions, is advantageous in decreasing the corrosion of metal parts in washing machines, besides giving processing benefits and generally improved powder properties. The more highly alkaline ortho- and metasilicates would normally only be used at lower amounts within this range, in admixture with the neutral or alkaline silicates.

The compositions of the invention are usually alkaline. In practice the compositions should give a pH of from about 8.5 to about 13.5 in use in aqueous wash solution. It is preferred, in particular for domestic products, to have a pH of from about 9.0 to about 11.0 as lower pH's tend to be less effective for optimum detergency building, and more highly alkaline products can be hazardous if misused. The pH is measured at the lowest normal usage concentration of 0.1% w/v of the product in water of 12° H (French permanent hardness, calcium only) at 50° C. so that a satisfactory degree of alkalinity can be assured in use at all normal product concentrations.

The detergent compositions of the invention will be in free-flowing particulate, e.g. powdered or granular form, and can be produced by any of the techniques commonly employed in the manufacture of such washing compositions, but preferably by slurry-making and spray-drying processes to form a detergent base powder to which the perborate monohydrate is added. It is preferred that the process used to form the compositions should result in a product having a moisture content of from about 4% to about 10% by weight.

The invention will now be illustrated by the following non-limiting Examples.

EXAMPLE I

Samples of sodium perborate monohydrate having different pore volumes and specific surface areas were subjected to an accelerated humidity test at 81% RH (relative humidity) under ambient temperature conditions and at 40° C.

The caking profiles after one week storage are shown in

TABLE I

| Sample | Sodium perborate monohydrate | | | Caking Profile* after one week | |
|---|---|---|---|---|---|
| N° | P.V. | S.A. | P.C.I. | Ambient | 40° |
| 1 | 0.19 | 3.29 | −7.02 | 5 | 5 |
| 2 | 0.20 | 2.77 | −7.23 | 5 | 5 |
| 3 | 0.24 | 4.05 | −4.70 | 5 | 5 |
| 4 | 0.25 | 5.33 | −3.11 | 5 | 5 |
| 5 | 0.27 | 6.15 | −1.66 | 5 | 4 |
| 6 | 0.31 | 6.25 | −0.31 | 5 | 4 |
| 7 | 0.36 | 4.85 | −0.15 | 5 | 4 |
| 8 | 0.35 | 5.27 | −0.04 | 5 | 2 |
| 9 | 0.29 | 7.51 | +0.32 | 3 | 3 |
| 10 | 0.26 | 10.02 | +1.90 | — | 1 |
| 11 | 0.33 | 7.85 | +1.91 | 1 | — |
| 12 | 0.34 | 7.60 | +1.98 | 1 | — |
| 13 | 0.28 | 9.50 | +2.00 | 2 | 1 |
| 14 | 0.32 | 8.66 | +2.41 | 1 | — |

*Caking Profile Rating:
1 Slight
2 Small
3 Partial
4 Caked
5 Severely caked.

From the above accelerated humidity test results the following conclusions can be drawn:

All samples 1–8 of sodium perbotare monohydrate having P.C.I. <0 were unsatisfactory.

Though sample 8 showed only small caking at 40° C., it caked severely at the ambient storage temperature storage condition.

All samples 9–14 of sodium perborate monohydrate having P.C.I. >0 within the invention were satisfactory, showing caking profiles which are clearly superior to the caking profiles of samples 1–8 having P.C.I. <0.

EXAMPLE II The following detergent powder compositions were prepared by spray-drying and post-dosing of the sodium perborate at 17% by weight level of the total com- position.

| Composition | % by weight |
|---|---|
| Sodium dodecyl benzene sulphonate | 6.2 |
| $C_{12}$–$C_{15}$ alcohol/7 ethylene oxides | 4.1 |
| Alkaline sodium silicate | 8.1 |
| Sodium sulphate | 11.94 |
| Sodium tripolyphosphate | 37.2 |
| $Na_4$—ethylene diamine tetraacetate | 0.14 |
| Sodium carboxymethylcellulose | 0.99 |
| Fluorescer | 0.43 |
| Moisture | 13.9 |
| Sodium perborate* | 17.0 |

*The post-dosed sodium perborate was:
(1) sodium perborate monohydrate having S.A. = 8.60 $m^2/g$, P.V. = 0.356 $cm^3/g$ and P.C.I. = 3.475.
(2) sodium perborate monohydrate having S.A. = 6.09 $m^2/g$, P.V. = 0.30 $cm^3/g$ and P.C.I. = −0.785.

These compositions, stored in open phials, were subjected to an accelerated storage test at ambient temperature (approx. 20° C.) and 81% relative humidity conditions, and the speed of bleach release was determined after 3, 5 and 7 days.

Speed of bleach release in % is:

$$\frac{\text{Titre of bleach released in 1 minute (mls of 0.01 M thiosulphate)}}{\text{Titre of bleach released in 15 minutes (mls of 0.01 M thiosulphate)}} \times 100\%$$

The results are shown in the following Table 2.

TABLE 2

| | % bleach released in 1 minute | |
|---|---|---|
| Days stored | Composition (1) | Composition (2) |
| 3 | 100 | 97 |
| 5 | 96 | 84 |
| 7 | 87 | 66 |

The above results clearly show the superior bleach release (delivery) of the composition (1) of the invention over composition (2) outside the invention, indicating that the sodium perborate monohydrate in the composition of the invention retains very well its rapid rate of dissolution, whereas the sodium perborate monohydrate of composition (2) loses its original rate of dissolution fairly rapidly.

EXAMPLE III

The following detergent powder compositions were prepared by spray-drying and post-dosing of the sodium perborate at 17% by weight level of the total composition.

| Composition | % by weight |
|---|---|
| Sodium dodecyl benzene sulphonate | 9.0 |
| $C_{12}$–$C_{15}$ alcohol/7 ethylene oxides | 1.5 |
| Sodium soap | 0.5 |
| Sodium tripolyphosphate | 12.0 |
| Trisodium orthophosphate | 13.5 |
| Alkaline sodium silicate | 8.0 |
| Sodium sulphate | 4.0 |
| Sodium ethylene diamine tetraacetate | 0.2 |
| Sodium carboxymethylcellulose | 1.0 |
| Polyacrylate polymer | 1.0 |
| Fluorescer | 0.3 |
| Moisture | 7.0 |
| Sodium sulphate (post-dosed) | 25.0 |
| Sodium perborate* (post-dosed) | 17.0 |

*The post-dosed sodium perborate was:
(1) sodium perborate monohydrate of P.C.I. = 3.475 and
(2) sodium perborate monohydrate of P.C.I. = −0.785 as used in Example II.

These compositions, stored in open phials, were subjected to an accelerated storage test at ambient temperature (approx. 20° C.) and 81% relative humidity conditions. Speed of bleach delivery was determined at regular intervals.

The results are shown in the following Table 3 below.

TABLE 3

| | % bleach released in 1 minute | |
|---|---|---|
| Days stored | Composition (1) | Composition (2) |
| 4 | 100 | 97 |
| 6 | 95 | 67 |
| 8 | 96 | 47 |
| 11 | 86 | 40 |

Product appearance after 11 days: light/moderate caking half caked.

The above results show that composition (1) of the invention is clearly supperior to composition (2) outside the invention.

EXAMPLE IV

The following detergent powder compositions were prepared by spray-drying and post-dosing of the sodium perborate at 20% by weight level of the total composition.

| Composition | % by weight |
|---|---|
| Sodium dodecyl benzene sulphonate | 7.5 |
| $C_{12}$–$C_{15}$ alcohol/11 ethylene oxides | 1.5 |
| Alkaline sodium silicate (1.6 ratio) | 6.0 |
| Zeolite HAB A40 (sodium aluminosilicate) | 20.0 |
| $Na_3$—nitrilotriacetate | 15.0 |
| Sodium sulphate | 21.0 |
| Sodium carboxymethylcellulose | 0.6 |
| Ethylene diamine tetraacetate | 0.2 |
| Fluorescer | 0.2 |
| Water | 8.0 |

-continued

| Composition | % by weight |
|---|---|
| Sodium perborate monohydrate* | 20.0 |

*The post-dosed sodium perborate monohydrate was
(1) of P.C.I. = 3.475 and
(2) of P.C.I. = −0.785 as used in Example II.

These compositions, stored in open phials, were subjected to an accelerated storage test at ambient temperature (approx. 20° C.) and 81% relative humidity conditions, and the product appearance was followed at regular intervals.

The results are tabulated in Table 4 below.

TABLE 4

| | Product Appearance | |
|---|---|---|
| Days stored | Composition (1) | Composition (2) |
| 1 | light caking | light caking |
| 2 | " | " |
| 3 | " | partly caked, remainder lightly caked |
| 4 | " | partly caked, remainder lightly caked |
| 7 | " | mostly caked |
| 9 | " | " |
| 10 | " | almost completely caked |
| 11 | moderate caking | " |

The above table shows clear superiority of the composition (1) of the invention to the composition (2) outside the invention.

EXAMPLE V

The following detergent powder compositions were prepared by spray-drying and post-dosing of the sodium perborate at 17% by weight level of the total composition.

| Composition | % by weight |
|---|---|
| Sodium dodecyl benzene sulphonate | 30.0 |
| Sodium carbonate | 31.0 |
| Neutral sodium silicate | 12.0 |
| Sodium carboxymethylcellulose | 0.5 |
| Fluorescer | 0.2 |
| Sodium ethylene diamine tetraacetate | 0.2 |
| Monastral blue dye | 0.1 |
| Sodium sulphate | 3.0 |
| Water | 6.0 |
| Sodium perborate* | 17.0 |

*The post-dosed sodium perborate was:
(1) sodium perborate monohydrate having S.A. = 8.60 $m^2/g$, P.V. = 0.356 $cm^3/g$ and P.C.I. = 3.475,
(2) sodium perborate monohydrate having S.A. = 6.09 $m^2/g$, P.V. = 0.30 $cm^3/g$ and P.C.I. = −0.785,
(3) sodium perborate tetrahydrate.

These compositions were stored in closed laminated packs of water vapour permeability of 37 $g/m^2/24$ hrs and subjected to a series of storage trials under the following storage conditions:

(a) ambient (~22° C./50% RH - relative humidity)
(b) 37° C./70% RH (relative humidity)
(c) 20° C./90% RH (relative humidity)

Powder Flow rates were determined as time (in seconds) taken for 100 ml powder to flow through a 1.3 cm diameter hole from a cone of 66° cone angle.

TABLE 5

| | | Powder flow rate (mls/sec.) after stated number of weeks | | |
|---|---|---|---|---|
| Composition | Conditions | 2 | 4 | 6 |
| (1) | (a) | 26.4 | 25.4 | 26.5 |

TABLE 5-continued

| Composition | Conditions | Powder flow rate (mls/sec.) after stated number of weeks 2 | 4 | 6 |
|---|---|---|---|---|
| | (b) | 25.9 | 26.6 | 26.9 |
| | (c) | 24.9 | 26.4 | C* |
| (2) | (a) | 22.1 | 24.8 | 24.7 |
| | (b) | 21.2 | C* | C* |
| | (c) | 22.7 | C* | C* |
| (3) | (a) | 22.8 | 23.3 | 18.5 |
| | (b) | 22.9 | C* | C* |
| | (c) | 20.3 | C* | C* |

C* = caked.

Whereas the composition (1) of the invention remained free-flowing under all three conditions and only started to cake after 6 weeks under the most severe conditions (c) of 20° C/90% RH, both compositions (2) and (3) outside the invention already caked after 4 weeks at both above 50% RH conditions (b) and (c).

Bleach delivery in 1 minute was determined by making a solution of 3 g/1 of sample, stirring it for 45 seconds, sampling at after 1 minute using a 25 ml aliquot and titrating it with 0.01 M thiosulphate. The number of mls of 0.01 M thiosulphate gives the titration value as measure of bleach delivery in 1 minute.

The results of said titration value determination as measure for bleach delivery/rate of dissolution are given in the following Table 6.

TABLE 6

| Composition | Conditions | Titration value (mls 0.01 M thiosulphate) after stated number of weeks storage — Weeks storage 2 | 4 | 6 | 8 | 10 | 12 |
|---|---|---|---|---|---|---|---|
| (1) | (a) | 22.7 | 21.9 | 22.3 | 22.3 | 19.1 | 21.5 |
| | (b) | 21.8 | 20.1 | 21.6 | 18.0 | 16.5 | 18.1 |
| | (c) | 20.9 | 22.8 | 20.2 | 13.1 | 12.9 | 12.3 |
| (2) | (a) | 20.1 | 21.1 | 19.5 | 19.2 | 19.5 | 20.1 |
| | (b) | 21.2 | 19.5 | 17.6 | 13.7 | 12.9 | 13.0 |
| | (c) | 18.3 | 18.6 | 17.4 | 9.4 | 11.0 | 11.4 |
| (3) | (a) | 13.0 | 12.0 | 12.0 | 9.7 | 9.5 | 8.4 |
| | (b) | 9.3 | 8.6 | 10.0 | 7.8 | 6.7 | 4.5 |
| | (c) | 9.3 | 7.4 | 8.1 | 7.3 | 4.9 | 3.9 |

The above results show that the composition (1) of the invention is categorically superior to compositions (2) and (3) with respect to bleach delivery (rate of dissolution of the sodium perborate) under all three storage test conditions.

We claim:

1. A method for preparing a free-flowing detergent powder comprising:

(i) selecting sodium perborate monohydrate having physical characteristics of specific surface area (SA in $m^2/g$) and pore volume (PV in $cm^3/g$) such that the formula ($SA+31.25\ PV-16.25$) is greater than zero; and (ii) combining from 5 to 50% by weight of said sodium perborate monohydrate, from 4 to 50% by weight of a detergent-active material selected from the group consisting of soap, synthetic anionic, nonionic, amphoteric, zwitterionic and cationic detergent-active materials and mixtures thereof, and from 5 to 80% by weight of a detergency builder.

2. A method for preparing a detergent powder composition according to claim 1, wherein said formula is greater than 1.

3. A method for preparing a detergent powder composition according to claim 1, wherein said perborate monohydrate has a pore volume greater than 0.2 $cm^3$/gram.

4. A method for preparing a detergent powder composition according to claim 1, wherein said perborate monohydrate has a specific surface area of more than 5 $m^2$/gram.

5. A method for preparing a detergent powder composition according to claim 4, wherein said specific surface area is greater than 7 $m^2$/gram.

6. A method for preparing a detergent powder composition according to claim 1, which is free from sodium tripolyphosphate builder.

7. A method for preparing a detergent powder composition according to claim 1, which has a phosphorus content of not more than 6% by weight.

8. A method for preparing a detergent powder composition according to claim 7, which contains a detergency builder system comprising sodium tripolyphosphate together with another builder selected from the group consisting of alkali metal nitrilotriacetates, alkali metal orthophosphates, alkali metal pyrophosphates, alkali metal carbonates, sodium aluminosilicates and mixtures thereof.

9. A method for preparing a detergent powder composition according to claim 7, which contains a detergency builder selected from the group consisting of alkali metal carbonates, sodium aluminosilicates, nitrilotriacetates and mixtures thereof.

10. A method for preparing a detergent powder composition according to claim 1, which contains from 4 to 25% by weight of a nonionic detergent-active material.

11. A method for preparing a detergent powder composition according to claim 10, containing from 5 to 16% by weight of said nonionic detergent-active material.

12. A method for preparing a detergent powder composition according to claim 1, wherein said sodium perborate monohydrate is present from about7 to 35% by weight.

13. A method for preparing a detergent powder composition according to claim 1, wherein said builder is other than alkalimetal aluminosilicate.

* * * * *